US012571869B2

(12) United States Patent
Cazoulat et al.

(10) Patent No.: US 12,571,869 B2
(45) Date of Patent: Mar. 10, 2026

(54) METHOD FOR LOCATING A GEO-TAG

(71) Applicant: Orange, Issy-les-Moulineaux (FR)

(72) Inventors: Renaud Cazoulat, Chatillon (FR);
Stéphane Glaziou, Chatillon (FR);
Valerie Ledunois, Chatillon (FR);
Claudia Meza Balanta, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 937 days.

(21) Appl. No.: 17/777,822

(22) PCT Filed: Nov. 4, 2020

(86) PCT No.: PCT/FR2020/051989
§ 371 (c)(1),
(2) Date: May 18, 2022

(87) PCT Pub. No.: WO2021/099711
PCT Pub. Date: May 27, 2021

(65) Prior Publication Data
US 2023/0003825 A1    Jan. 5, 2023

(30) Foreign Application Priority Data
Nov. 19, 2019    (FR) ...................................... 1912868

(51) Int. Cl.
*G01S 5/00* (2006.01)
*G01S 5/02* (2010.01)

(52) U.S. Cl.
CPC ............ *G01S 5/0072* (2013.01); *G01S 5/019* (2020.05); *G01S 5/0284* (2013.01)

(58) Field of Classification Search
CPC ...... G01S 5/0072; G01S 5/0284; G01S 5/019; G01S 5/0295; G01S 5/0027; G01S 5/002; G01S 2205/01
(Continued)

(56) References Cited

U.S. PATENT DOCUMENTS 9,494,674 B2 *  11/2016  Messier .................. G01S 19/48
9,672,568 B1 *   6/2017  Slusar ................... B60W 40/09
(Continued)

FOREIGN PATENT DOCUMENTS

WO        0038460 A1    6/2000
WO    2015119546 A1    8/2015

OTHER PUBLICATIONS

English translation of the Written Opinion of the International Searching Authority dated Feb. 18, 2021 for corresponding International Application No. PCT/FR2020/051989, filed Nov. 4, 2020.
(Continued)

*Primary Examiner* — Jinsong Hu
(74) *Attorney, Agent, or Firm* — David D. Brush; Westman, Champlin & Koehler, P.A.

(57) ABSTRACT

A method for managing transmission of a location of a first geo-tag capable of communicating with a second geo-tag, the tags being classified in several respective categories, the first tag being associated with a first category. The method includes implementing following steps in the first tag: a. detecting a proximity between the first geo-tag and the second geo-tag; b. obtaining the category associated with the second tag; c. transmitting, to the second tag, a request to transfer management of the transmission of the location of the first tag, if the obtained category belongs to a second tag category.

7 Claims, 2 Drawing Sheets

(58) Field of Classification Search
USPC ...................................................... 455/456.1
See application file for complete search history.

(56)                              References Cited

U.S. PATENT DOCUMENTS

| | | | | |
|---|---|---|---|---|
| 10,091,710 | B2 * | 10/2018 | Van Phan ............. | H04W 48/20 |
| 10,422,850 | B2 * | 9/2019 | Eldic .................... | G01S 19/396 |
| 10,645,534 | B1 * | 5/2020 | Klinkner ............. | H04W 64/003 |
| 2009/0128412 | A1 | 5/2009 | Ryu et al. | |
| 2009/0201850 | A1 | 8/2009 | Davis et al. | |
| 2014/0300471 | A1 * | 10/2014 | Guo ................... | G08B 21/0258 |
| | | | | 340/539.32 |
| 2016/0269860 | A1 * | 9/2016 | Weizman ................ | H04W 4/80 |
| 2017/0374515 | A1 * | 12/2017 | Cox ................... | G08B 21/0227 |
| 2019/0087561 | A1 * | 3/2019 | Kumar .................... | G06F 21/32 |
| 2022/0007132 | A1 * | 1/2022 | Ivanov .................... | G01S 5/163 |

OTHER PUBLICATIONS

International Search Report dated Jan. 26, 2021 for corresponding International Application No. PCT/FR2020/051989, Nov. 4, 2020.
Written Opinion of the International Searching Authority dated Jan. 26, 2021 for corresponding International Application No. PCT/FR2020/051989, filed Nov. 4, 2020.
French Search Report and Written Opinion dated Oct. 7, 2020 for corresponding French Application No. 1912868, filed Nov. 19, 2019.

* cited by examiner

[Fig. 1]
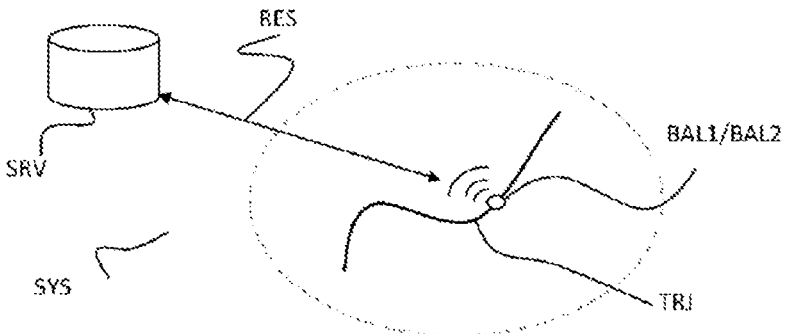
[Fig. 2]
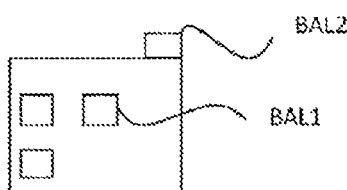
[Fig. 3]
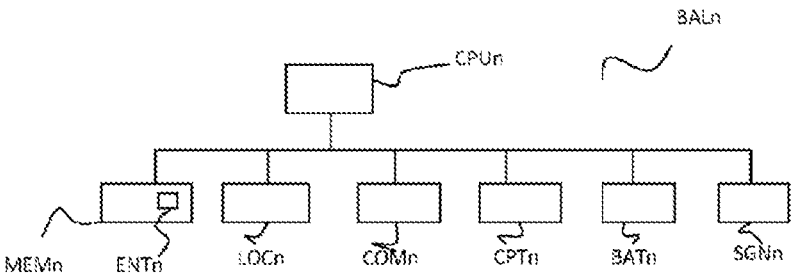

[Fig. 4]
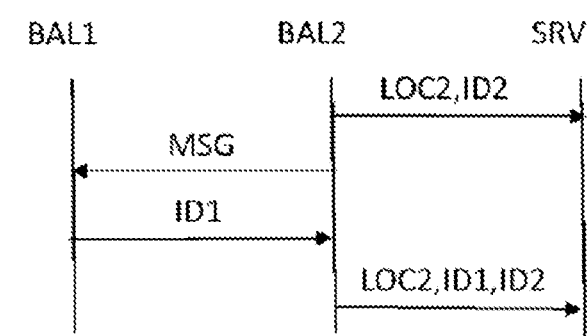
[Fig. 5]
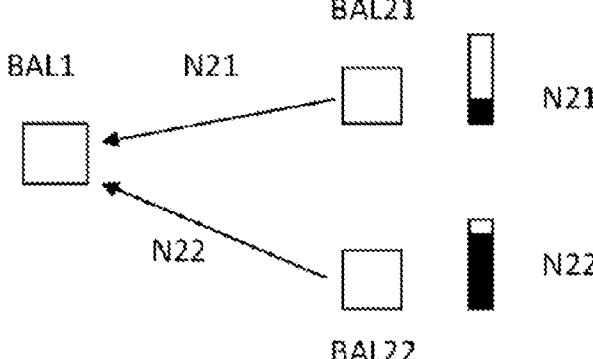
[Fig. 6]
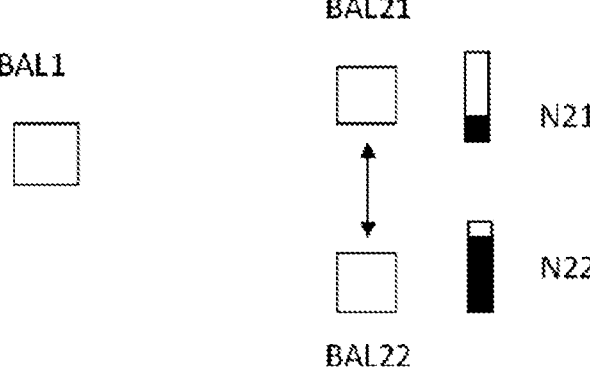

METHOD FOR LOCATING A GEO-TAG

CROSS-REFERENCE TO RELATED APPLICATIONS

This Application is a Section 371 National Stage Application of International Application No. PCT/FR2020/051989, filed Nov. 4, 2020, which is incorporated by reference in its entirety and published as WO 2021/099711 A1 on May 27, 2021, not in English.

TECHNICAL FIELD

The invention relates to the field of telecommunications.

The invention relates more particularly to a method for managing the transmission of the location of a first geo-tag able to communicate with a second geo-tag.

The geo-tag that is targeted here is a geo-tag equipped with a battery and able to transmit location data, also called traceability tag.

PRIOR ART

The market for the Internet of Things is undergoing a real boom, both with individuals and with businesses. Connected objects are mostly equipped with a (rechargeable) battery or a cell. The autonomy of the objects is therefore a real hindrance on the expansion of these objects.

In particular, geo-tags are widely used to locate and track objects while they are respectively moving. These tags are fixed to the object or placed in the object and periodically transmit geographical positions, making it possible to locate and track the object while it is moving.

When a parcel is dispatched and it is desired to monitor its movement, a geo-tag is placed inside the parcel. During this journey, the parcel may need to be transported in a larger receptacle, such as a container, a pallet or a trailer of a truck, which is itself equipped with a geo-tag.

During transportation, the various tags transmit their respective location information, for example their GPS positions, to a traceability server.

However, for each geo-tag, sending location data to the server requires a phase of connection to the network and a phase of obtaining location data (for example GPS coordinates). These two phases consume a great deal of electrical energy.

The electricity consumption linked to the communication of data to the server, for example the location data, is for its part very low in comparison with the abovementioned phases.

The problem outlined above is exacerbated by another problem linked to the fact that receptacles, such as metal containers, often act as a Faraday cage, and the tags located in the receptacle attempt in vain to transmit their respective locations and thereby risk rapidly draining their battery levels.

One aim to be achieved is therefore that of reducing the consumption linked to the two abovementioned phases and of reducing the negative effects linked to Faraday cages.

The invention aims to improve the situation.

The Invention

To this end, according to one functional aspect, the invention relates to a method for managing the transmission of the location of a first geo-tag able to communicate with a second geo-tag, the tags being classified into a plurality of respective categories, the first tag being associated with a first category, the method comprising the following steps in the first tag:

a. detecting proximity between the first tag (BAL1) and the second geo-tag (BAL2);

b. obtaining the category associated with the second tag (BAL2);

c. transmitting, to the second tag (BAL2), a request to transfer the management of the transmission of the location of the first tag, if the obtained category belongs to a second tag category.

In contrast to the prior art, in which each geo-tag manages the transmission of its location on its own, the invention proposes, as soon as proximity is detected between a first tag of a first category and a geo-tag of a second category, to transfer the management of the transmission of the location of the first tag to the second tag. According to the invention, the second tag transmits the identifier of the first tag and its own location. The invention is based on the fact that the receiver, due to the proximity between the geo-tags of the two different categories, assimilates the location of the first tag to the location of the second tag.

By virtue of the invention, once the management has been transferred, the first tag modifies its state so as to consume less electrical energy. For example, the first tag changes to a standby state. In this way, only the second geo-tag, which the first tag has entrusted with managing its location, consumes electrical energy, in particular in the phase of connection to the network and in the phase of obtaining location data. The saving on electrical energy is greater the higher the number of first geo-tags under consideration in the receptacle.

The invention also provides another advantage due to the fact that the first tag delegates the management of the transmission of the location to a tag of a particular category, for example a tag associated with a receptacle that is not subject to the Faraday cage problem for the transmission of location data; indeed, the second tag associated with the receptacle, such as a container, may be placed outside the receptacle and therefore be less subject to data transmission problems.

According to a first particular mode of implementation of the invention, the categories are ranked; in this configuration, the transmission step is performed based on the hierarchical levels of said categories. This first mode offers a simple solution for deciding whether or not to transfer management. For example, the transmission step takes place if the category associated with the second tag is higher than the hierarchical level of the first tag.

According to another, second particular mode of implementation of the invention, which may be implemented as an alternative or in addition to the previous mode, the transfer is preceded by reception of an acknowledgement message from the second tag. This second mode ensures that the transfer is effective before deciding to modify the electrical state of the first tag; a modification of the electrical state consisting for example in entering a mode that consumes little electricity, for example a standby mode.

According to another, third particular mode of implementation of the invention, which may be implemented as an alternative or in addition to the previous ones, the transfer is stopped as soon as the first tag is out of range of the second tag. This third mode ensures that the second tag stops managing the transmission of the location of the first tag; and more particularly that the second tag stops transmitting the identifier of the first tag.

According to one hardware aspect, the invention relates to a management entity for managing the transmission of the location of a first geo-tag able to communicate with a second geo-tag, the tags being classified into a plurality of respective categories, the first tag being associated with a first category, the entity comprising:

a. a detection module for detecting proximity between the first tag and a second geo-tag;

b. an obtainment module for obtaining the category associated with the second tag;

c. a transmission module able to transmit, to the second tag, a request to transfer the management of the transmission of the location of the first tag, if the obtained category belongs to a second tag category.

According to another hardware aspect, the invention relates to a geo-tag comprising a management entity as defined above.

According to another hardware aspect, the invention relates to a computer program able to be implemented on a management entity as defined above, the program comprising code instructions, which, when it is executed by a processor, performs the steps of the method that are defined above.

Finally, the invention relates to a data medium storing at least one series of program code instructions for executing the method defined above.

The data medium may be any entity or device capable of storing the program. For example, the medium may comprise a storage means, such as a ROM, for example a CD-ROM or a microelectronic circuit ROM, or else a magnetic recording means such as a hard disk. Moreover, the information medium may be a transmissible medium such as an electrical or optical signal, which may be routed via an electrical or optical cable, by radio or by other means. The program according to the invention may in particular be downloaded from an Internet network. As an alternative, the information medium may be an integrated circuit in which the program is incorporated, the circuit being designed to execute or to be used in the execution of the method in question.

Finally, it should be pointed out here that, in the present text, the term "module" or "entity" may correspond equally to a software component and to a hardware component or a set of hardware and software components, a software component itself corresponding to one or more computer programs or subroutines or, more generally, to any element of a program able to implement a function or a set of functions as described for the modules in question. In the same way, a hardware component corresponds to any element of a hardware assembly able to implement a function or a set of functions for the module in question (integrated circuit, chip card, memory card, etc.).

The invention will be better understood upon reading the following description, given by way of example and with reference to the appended drawings, in which:

FIG. 1 shows a computer system on which one exemplary embodiment of the invention is illustrated.

FIG. 2 is a schematic view of one possible configuration of tags in a container.

FIG. 3 is a schematic view of the architecture of a geo-tag.

FIG. 4 illustrates one example of steps implemented in the context of a method according to one embodiment.

FIG. 5 illustrates one exemplary embodiment in which two tags of a second category communicate with the first tag in order to determine the tag of a second category that will be responsible for transmitting the location of the first tag.

FIG. 6 illustrates one variant of the exemplary embodiment illustrated in FIG. 5.

DETAILED DESCRIPTION OF ONE (OR MORE) EXEMPLARY EMBODIMENT(S) ILLUSTRATING THE INVENTION

FIG. 1 shows a system SYS comprising geo-tags, specifically traceability tags BAL1-BAL2. In our example, these tags are associated with objects; they may for example be attached to the object or located inside the object. An object is for example a parcel, a suitcase, a container, etc. FIG. 2 illustrates one example of a possible configuration in which the tag BAL1 is in a container and the tag BAL2 is affixed to the container on the outside.

A tag makes it possible to obtain the position of the tag over time, and implicitly of the object with which it is associated. A tag has the role of transmitting, inter alia, an item of data representative of a location when it is being transported during a journey TRJ.

The tags are able to communicate with a server SRV that receives the locations. The location of the tag makes it possible to locate the object with which it is associated.

With reference to FIG. 3, a tag BALn (n=1,2) has a hardware architecture of a conventional computer. It comprises in particular a processor CPUn, a random access memory RAMn (not shown in the figure), and a read-only memory MEMn, such as a Flash, ROM, etc. memory.

The tag BALn is able to transmit data to other tags, either directly or indirectly. Indirect communication could be implemented through a gateway (or router).

Direct communication could be a short-range link RES. A short-range network refers here to a network having limited coverage in terms of distance. In this context, a first tag BAL1 may transmit data beyond a given distance, by way of the short-range network, to at least one other tag BAL2. The short-range link is for example an RFID (radiofrequency identification) network, a Bluetooth network, or any other equivalent network. To this end, a tag is equipped with a data transmitter COMn and with a data receiver CPTn able to receive data, or more precisely signals, via this short-range network.

The use of a short-range network has the advantage of identifying geo-tags that are close to one another, communication between two geo-tags being sufficient to establish proximity.

The invention is not limited to short-range networks, but extends to all types of network, such as a Wi-Fi network or the like. The proximity between tags is therefore relative in that it depends on the communication network used.

The tags BAL1/BAL2 are also able to transmit data to a remote traceability server SRV via a network having a longer range; such a network is for example a wide area network WAN (not shown in the figures).

The tags BAL1-BAL2 are, in our example, also equipped with respective batteries BAT1-BAT3 in order to be supplied with electric power. It will be recalled here that the invention is not limited to tags supplied with power by a battery, but extends to all tags, regardless of the electric power source used.

A tag also comprises a location module LOC whose role is that of obtaining an item of location data representative of the location of the tag, and implicitly of the object with which it is associated. In our example, the location module is a geolocation module (GPS) (GPS for global positioning system). The item of location data may also be a postal address, etc.

The tags belong to different categories. In our example, a first category concerns tags used to locate an object such as a parcel; a second category concerns tags used to locate receptacles such as containers possibly containing a plurality of objects or parcels.

According to one particular embodiment, a tag is controlled by the entity ENTn, the index "n" (n=1 or 2) denoting the tag BAL1 or BAL2 stored in the memory MEMn. The computer program ENTn comprises instructions for implementing the steps of the management method that will be described below when the program is executed by the processor CPUn.

The entity ENT1 has the role of performing the following steps:

detecting proximity between the first tag BAL1 and a second geo-tag BAL2, the tag then determines the category of the second tag;

if the second tag is associated with a second category, this being the case in our example, the first tag BAL1 transmits a command to transfer (or delegate) the transmission of the location to the second tag BAL2. In the opposite case, the method stops and the first tag does not modify its operation.

In our example, the command transmitted by the first tag comprises an item of data ID1 identifying the first tag.

In our example, once the delegation request has been transmitted, the entity ENT1 requests a change of electrical state of the first tag so that it consumes less or no further battery. More particularly, in our example, the tag enters a standby state.

The location of the entity ENT1, just like the entity ENT2, in the system SYS is unimportant. It may be located in a geo-tag or an external device such as a server. In our example, the entities ENT1 and ENT2 are located in the first tag BAL1 and the second tag BAL2, respectively.

FIG. 4 schematically illustrates the message exchanges according to one embodiment of the method of the invention. Four lines are shown in this FIG. 4, specifically three lines representing the two tags BAL1-BAL2 and one line SRV representing the server; the exchanged messages are illustrated by way of arrows having an origin associated with one line and an end associated with another line.

Upon initialization, the code instructions of the computer program are for example loaded into a memory before being executed by the processor CPU. The processor CPU of the processing unit in particular implements the following steps:

In a first step ET1, the tags BAL1-BAL2 transmit advertising messages including their identifiers ID1-ID2. The second tag furthermore transmits an item of data representative of its category, specifically the second category CAT2.

According to one variant, only the tags belonging to the second category transmit an item of data representative of their categories. According to another variant, all of the tags transmit their respective categories.

In a second step ET2, the first tag BAL1 is located within the radius of coverage of the second tag BAL2 and to this end receives an advertising message from the second tag BAL2. The type of message differs depending on the technology used for the communication. For example, if the UPnP protocol is used, the message may be an Alive SSDP or M-Search message depending on whether or not the tag is a control point; this type of message advertises the presence of the tag that transmits this message. In our example, the advertising message includes an item of data representative of a tag category.

In a third step ET3, after having received the advertising message, the first tag BAL1 verifies, in the received message, the category of the second tag BAL2. In our example, the category is a second category distinct from the first category. The second category targets a tag that may be associated with a container-type receptacle.

In a fourth step ET4, the first tag BAL1 transmits a message to the second tag BAL2, the message requesting that the second tag BAL2 take responsibility for managing the location of the first tag. More particularly, the targeted request is a request to transfer the management of the transmission of the location of the first tag BAL1 to the second tag BAL2.

In an optional fifth step ET5, the second tag BAL2 transmits an acknowledgement message ACK to the first tag BAL1 This acknowledgement message effectively transfers the management of the transmission of the location by the second tag BAL2.

This acknowledgement message ACK is received in a sixth step ET6. After reception, the first tag BAL1 no longer manages the transmission of its location. In our example, the first tag BAL1 switches to a standby state in order to reduce its electricity consumption and thus increase the electricity autonomy of its battery.

With reference to FIGS. 5 and 6, a first tag BAL1 may be located in proximity to two tags of a second category. In order to avoid the first tag delegating the management of the transmission of its location to two tags of a second category BAL21/BAL22, a plurality of solutions are conceivable, these being illustrated in FIGS. 5 and 6, respectively.

With reference to FIG. 5, a first solution consists, for the tags of a second category, in transmitting respective battery levels N21/N22 to the first tag BAL1 In this case, the first tag BAL1 may select a tag of a second category based on the battery level N21/N22. In order not to penalize a tag of a second category, the first tag selects the tag of a second category that has the highest battery level.

With reference to FIG. 6, a second solution may consist, for tags of a second category receiving two delegation requests, in themselves selecting the tag of a second category that will be selected. More precisely, the steps are as follows:

The first step ET1 described above remains unchanged.

In a second step, the first tag BAL1 is within the radius of coverage of the tags of a second category BAL21 and BAL22 and may to this end receive advertising messages from the two tags BAL21 and BAL22.

In a third step, after having received the advertising message, the first tag BAL1 verifies, in the received message, the categories received from the two tags. In our example, the tags are tags of a second category.

In a fourth step, the first tag BAL1 transmits messages to the two tags of a second category BAL21 and BAL22, the message requesting that the tags BAL21 and BAL22 take responsibility for managing the location of the first tag BAL1.

In a fifth step, the tags determine the higher battery level out of the two battery levels.

In our example, the battery level of the tag BAL22 is higher; the tag BAL22 therefore takes responsibility for managing the transmission of the location of the tag BAL1 instead of the tag BAL1 In this example, the tag BAL21 therefore does not generate the transmission of the location for the first tag BAL1.

In one step, the tag BAL22 transmits an acknowledgement message ACK. At this stage, the first tag may enter a standby state.

It will be considered that, subsequently, the tag BAL22 moves and is located out of range of the first tag BAL1. It will also be assumed that the first tag is within the radius of coverage of the second tag BAL21; In this case, the second tag BAL21 takes over and manages the transmission of the location of the first tag BAL1.

The invention claimed is:

1. A method comprising:

managing transmission of a location of a first geo-tag, which is able to communicate with a second geo-tag, depending on a proximity between the first and second geo-tags, the first and second geo-tags being classified into a plurality of respective tag categories, the first geo-tag being associated with a first tag category, the managing being implemented in the first geo-tag and comprising:

obtaining the tag category associated with the second geo-tag;

detecting whether the first geo-tag is proximate the second geo-tag; and in response to detecting proximity between the fist geo-tag and the second geo-tag and if the obtained tag category belongs to a second tag category:

transmitting, to the second geo-tag, a request to transfer the management of the transmission of the location of the first geo-tag;

otherwise, the first geo-tag transmitting the location to a server.

2. The method as claimed in claim 1, wherein the categories are ranked, and the transmitting of the request to transfer is performed based on hierarchical levels of said categories.

3. The method as claimed in claim 1, wherein the transfer is preceded by receiving an acknowledgement message from the second geo-tag.

4. The method as claimed in claim 1, comprising stopping the transfer as soon as the first geo-tag is out of range of the second geo-tag.

5. A management entity for managing transmission of a location of a first geo-tag, which is able to communicate with a second geo-tag, depending on a proximity between the first and second geo-tags, the first and second geo-tags being classified into a plurality of respective categories, the first geo-tag being associated with a first tag category, the management entity comprising:

a processor; and a non-transitory computer-readable medium comprising instructions stored thereon which when executed by the processor configure the management entity to:

obtain the tag category associated with the second geo-tag;

detect whether the first geo-tag is proximate the second geo-tag; and in response to detecting proximity between the fist geo-tag and the second geo-tag and if the obtained tag category belongs to a second tag category:

transmit, to the second geo-tag, a request to transfer the management of the transmission of the location of the first geo-tag;

otherwise, the first geo-tag transmitting the location to a server.

6. A geo-tag comprising the management entity as defined in claim 5.

7. A non-transitory computer-readable data medium storing at least one series of program code instructions for executing a method for managing transmission of a location of a first geo-tag, which is able to communicate with a second geo-tag, depending on a proximity between the first and second geo-tags, when the instructions are executed by a processor of the first geo-tag, the first and second geo-tags being classified into a plurality of respective categories, the first geo-tag being associated with a first tag category, the method comprising:

obtaining the tag category associated with the second geo-tag;

detecting whether the first geo-tag is proximate the second geo-tag; and in response to detecting proximity between the fist geo-tag and the second geo-tag and if the obtained tag category belongs to a second tag category:

transmitting, to the second geo-tag, a request to transfer the management of the transmission of the location of the first geo-tag;

otherwise, the first geo-tag transmitting the location to a server.

* * * * *